US012749076B2

(12) United States Patent
Ohtamaa et al.

(10) Patent No.: US 12,749,076 B2
(45) Date of Patent: Sep. 29, 2026

(54) PRIVATE ORACLE-BASED TRUSTLESS SMART CONTRACT EXECUTION

(71) Applicant: Market Software Ltd., Gibraltar (GB)

(72) Inventors: Mikko Ohtamaa, Gibraltar (GB); Teemu Sorvisto, Twickenham (GB)

(73) Assignee: Market Software Ltd., Gibraltar (GI)

( * ) Notice: Subject to any disclaimer, the term of this patent is extended or adjusted under 35 U.S.C. 154(b) by 0 days.

(21) Appl. No.: 18/765,670

(22) Filed: Jul. 8, 2024

(65) Prior Publication Data

US 2025/0014028 A1 Jan. 9, 2025

Related U.S. Application Data

(60) Provisional application No. 63/604,255, filed on Nov. 30, 2023, provisional application No. 63/525,695, filed on Jul. 9, 2023.

(51) Int. Cl.
*G06Q 20/38* (2012.01)
*G06Q 20/36* (2012.01)

(52) U.S. Cl.
CPC ......... *G06Q 20/389* (2013.01); *G06Q 20/367* (2013.01)

(58) Field of Classification Search
CPC ........................... G06Q 20/389; G06Q 20/367
USPC ........................................................... 705/64
See application file for complete search history.

(56) References Cited

U.S. PATENT DOCUMENTS

| | | | | |
|---|---|---|---|---|
| 10,878,415 | B1 | 12/2020 | Yang et al. | |
| 11,423,450 | B2 | 8/2022 | Preston et al. | |
| 11,934,425 | B1 * | 3/2024 | Hall | G06F 16/275 |
| 12,118,127 | B1 * | 10/2024 | Cordi | H04L 9/3297 |
| 2017/0308893 | A1 | 10/2017 | Saraniecki | |
| 2020/0118068 | A1 * | 4/2020 | Turetsky | H04L 63/123 |
| 2020/0211109 | A1 * | 7/2020 | Bean | G06Q 20/223 |
| 2021/0027369 | A1 | 1/2021 | Raheman et al. | |
| 2021/0056628 | A1 * | 2/2021 | Jang | G06Q 10/04 |
| 2021/0166313 | A1 | 6/2021 | Cho | |
| 2021/0334866 | A1 * | 10/2021 | Schneider | G06Q 30/0201 |
| 2022/0318911 | A1 * | 10/2022 | Heitkotter | G06Q 40/04 |
| 2023/0136805 | A1 * | 5/2023 | Morais | G06Q 20/401 705/75 |
| 2024/0046352 | A1 * | 2/2024 | Negron | G06Q 20/389 |

* cited by examiner

*Primary Examiner* — Courtney P Jones
(74) *Attorney, Agent, or Firm* — Adams Intellex, PLC

(57) ABSTRACT

Techniques for data analysis based on a provable ordered transaction history are disclosed. A private, provable ordered transaction history of a tokenized asset is created. The provable ordered transaction history is based on a plurality of on-chain transactions from one or more blockchains. A decision strategy based on the provable ordered transaction history is developed. The decision strategy comprises a program that activates one or more action instructions for a smart contract. The decision strategy is deployed on a private centralized oracle and initiates the smart contract on the one or more blockchains. One or more action instructions are sent by the decision strategy that was deployed to the smart contract. The one or more action instructions are responsive to one or more on-chain transactions and are executed by the smart contract, resulting in at least one new blockchain transaction.

27 Claims, 8 Drawing Sheets

PRIVATE ORACLE-BASED TRUSTLESS SMART CONTRACT EXECUTION

RELATED APPLICATIONS

This application claims the benefit of U.S. provisional patent applications "History-Based Trustless Smart Contract Execution" Ser. No. 63/525,695, filed Jul. 9, 2023 and "Trustless Smart Contract Execution Based On Transformed Data" Ser. No. 63/604,255, filed Nov. 30, 2023.

Each of the foregoing applications is hereby incorporated by reference in its entirety.

FIELD OF ART

This application relates generally to data analysis and more particularly to history-based trustless smart contract execution.

BACKGROUND

For millennia, markets have been the centers where people can conduct trade. They have developed in diverse cultures as places where sellers provide goods and services, and buyers purchase the goods and services. Open air markets were known to have existed in ancient Babylonia, Assyria, Phoenicia, Israel, Greece, Egypt, and Arabia. As markets expanded, trade routes developed, allowing goods from other lands and cultures to be bought and sold across continents, and shipped across oceans. Many markets retain direct, face-to-face interactions between sellers and buyers, allowing buyers to make special requests and sellers to personalize their offerings to the buyers. Popular markets today include the bazaars of the Middle East and Asia where vegetables, meats, spices, and household items, among many other foodstuffs and wares, can be bought, sold, traded, and bartered. Other popular markets that typically operate on a smaller scale are the local farmers markets found in many towns. Some marketplaces operate on an ad hoc or seasonal basis, while others operate year-round. Some use established structures including market squares and halls, while others rely on mobile tents, portable stalls, or open vehicles to display goods. These markets provide a wide range of fruits, vegetables, and meats. The farmers markets also commonly provide cheeses, soaps, spices, and handcrafted items. The farmers markets allow a buyer to purchase handmade personal care items and wooden kitchen spoons as easily as organic carrots and heirloom apples. The farmers markets are not limited strictly to rural areas. Instead, these markets are also now commonly found in many urban areas, thereby greatly expanding purchasing opportunities for buyers looking for fresh, organic and locally sourced items.

Some locales have established areas dedicated to markets, with designs adapted to local conditions including weather, traditions, and culture. In hot, desert areas, markets tend to be covered to protect both traders and shoppers from the sun. In milder climates, markets tend to be in the open air. Floating markets with goods being sold from boats can be found in many parts of Asia, including Thailand, Indonesia, and Vietnam. Depending on the goods being sold, the times during which markets are open can vary. Farm produce and seafood markets, for example, often open in the early morning hours, allowing buyers to select from the freshest goods.

Additional popular markets include the sublime such as antique and auto fairs, and the modest such as flea markets and rummage sales. And the markets are no longer limited to in-person affairs. As computers, mobile networks, and online finance became commonplace, online marketing has become a natural next step in the evolution of buying and selling goods and services. Sellers are finding wider markets for their goods and services by offering items online. Many buyers find the online markets convenient, not only because they do not have to travel to the markets, but also because they can find a wider selection of available items. Financing can often be easily arranged online as well, for purchases large or small. Whatever the good or service offered by a seller, a buyer can find a particular good or service for which they are looking.

SUMMARY

Trading goods and services has been fundamental to human interaction. Relying on what Adam Smith termed the "double coincidence of wants", the barter system was used to obtain needed goods or services in exchange for those already in one's possession. Later, a centralized monetary system streamlined trading between partners. Today, there are many venues for trading. Examples includes brick and mortar stores which carry goods that can be purchased, online markets which have been established based on credit, and stock markets which provide exchanges in which buyers and sellers can trade stocks, bonds, futures, options, and so on. One problem with these exchanges is that a third party is usually required to complete a transaction between trading partners. For example, licensed brokers act as a go-between to carry out stock or derivative transactions for clients. The broker must be trusted to fulfill obligations and ensure that an agreed-to transaction takes place.

Techniques for data analysis based on a provable ordered transaction history are disclosed. A private, provable ordered transaction history of a tokenized asset is created. The provable ordered transaction history is based on a plurality of on-chain transactions from one or more blockchains. A decision strategy based on the provable ordered transaction history is developed. The decision strategy comprises a program that activates one or more action instructions for a smart contract. The decision strategy is deployed on a private centralized oracle and initiates the smart contract on the one or more blockchains. One or more action instructions are sent by the decision strategy that was deployed to the smart contract. The one or more action instructions are responsive to one or more on-chain transactions and are executed by the smart contract, resulting in at least one new blockchain transaction.

Disclosed embodiments provide a processor-implemented method for data analysis comprising: creating a private, provable ordered transaction history of a tokenized asset, wherein the provable ordered transaction history is based on a plurality of on-chain transactions from one or more blockchains; developing a decision strategy, wherein the decision strategy is based on the provable ordered transaction history, wherein the decision strategy comprises a program that activates one or more action instructions for a smart contract; deploying the decision strategy on a private centralized oracle, wherein the decision strategy initiates the smart contract on the one or more blockchains; sending the one or more action instructions, by the decision strategy that was deployed, to the smart contract, wherein the one or more action instructions are responsive to one or more on-chain transactions; and executing the one or more action instructions, by the smart contract, wherein the executing results in at least one new blockchain transaction. Some embodiments include collecting, from the one or more blockchains, transaction data associated with the plurality of on-chain transactions, wherein the collecting is based on a private blockchain data indexer. Some embodiments include transforming the transaction data, wherein the transforming produces the provable ordered transaction history. Other embodiments include backtesting the decision strategy, wherein the back testing is based on the provable ordered transaction history. In some embodiments, the decision strategy includes one or more protection parameters.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
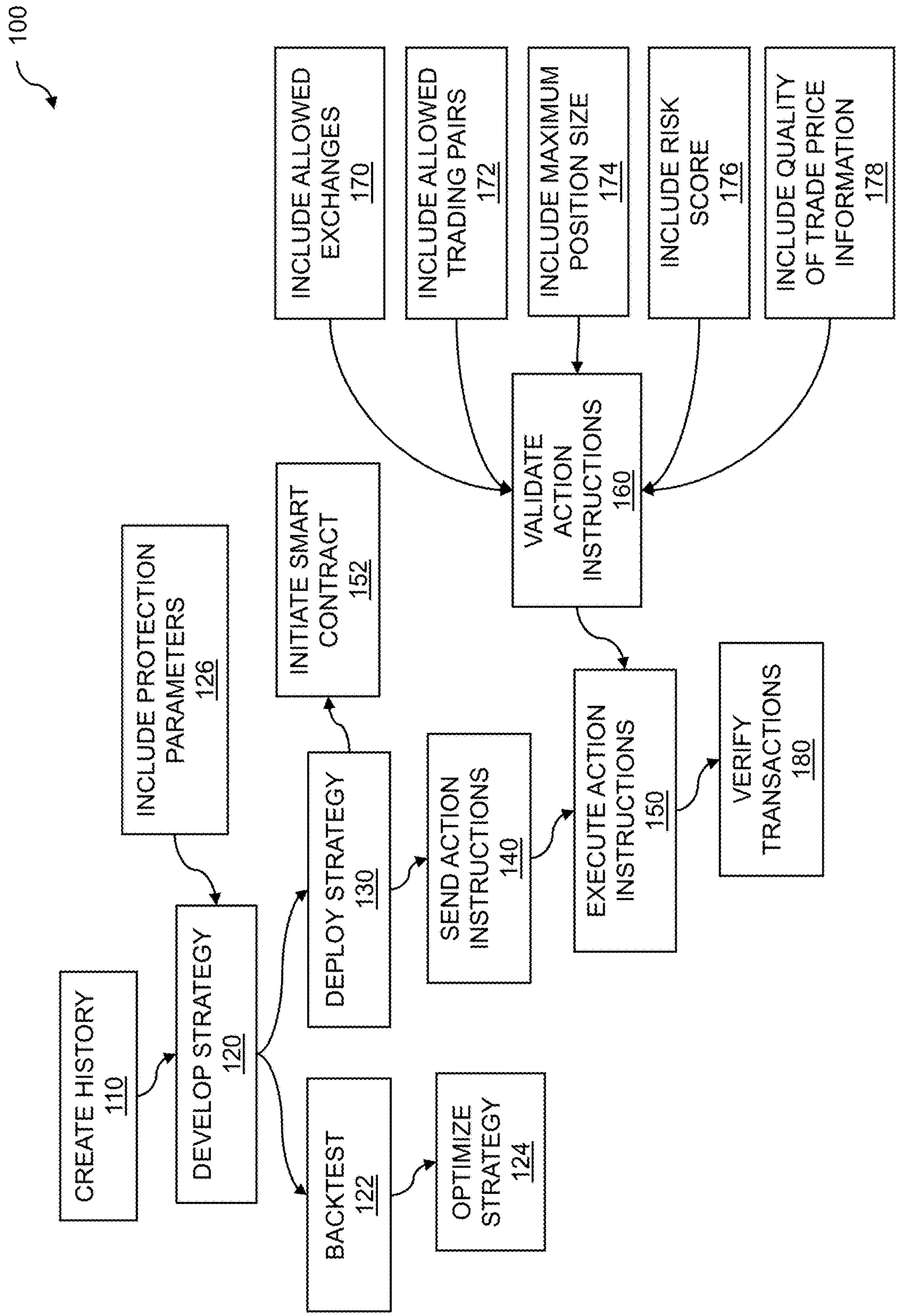
FIG. 1 is a flow diagram for private oracle-based trustless contract execution.

Markets enable transactions between buyers and sellers. For example, simple direct markets, such as a flea market, allow a buyer to directly pay a seller for goods or services. A homeowner can pay taxes directly to a town. A storefront can enable a buyer to immediately purchase inventory from a proprietor. Because they are "in person", transactions such as these are subject to the discretion of the buyer. For example, if a store seems dilapidated or is located in a high crime area, a buyer may decide to take his/her business elsewhere. In another example, a buyer can decide to halt a sale if a seller does not seem trustworthy. If the seller changes details of the transaction, such as adding hidden fees, the buyer can stop the execution before payment is made. In each of the examples above, trust is required between the buyer and the seller in order for execution of a sale to take place.

Technological advancements have led to an explosion of online markets allowing sellers to market goods and services to potential customers located regionally, nationally, or globally. These markets can include websites, apps, or even highly organized and regulated exchanges. In each platform, buyers can compare offerings from several sellers and can execute a purchase via various methods of payment including an account, a credit card, a digital currency, and so on. In many cases, the seller and buyer never meet. Even in these cases, trust is still required between buyer and seller. For example, the buyer must trust that the seller has accurately described merchandise for sale and will ship it according to the purchase agreement. Behind the scenes, additional trust is required between the buyer and a number of third parties that enable the transaction. For example, a buyer must trust that an app store will deliver the app to the buyer's device, that a credit card company will charge the correct fees, or that a shipping company will safely deliver the merchandise purchased. The need for trust escalates when dealing with a non-tangible asset. For example, an investor who purchases shares of stock through a broker must trust an entire chain of proxies including individuals, corporations, and computerized trading systems. While many markets are regulated, the user must still trust that the order will be processed and cleared, and that fees will be in line with expectations as the transaction is executed through various stages. Transactions over blockchain technology necessitate another level of trust as buyer and seller are only identified by a wallet address. The purchase of a digital asset requires trust by the buyer that the seller actually owned the asset they were selling, that the transaction took place according to a predetermined agreement, and that the buyer will actually become the new owner of the asset. In the case of cryptocurrency trading pairs, the buyer must ensure that the correct rate will be applied, that the system performing the transaction is reputable, that another party cannot interfere with the transaction, and so on. Disclosures include methods for enabling trustless transactions between parties. The transactions can be based on developing an immutable decision strategy which can run on a private centralized oracle and send verifiable action instructions for execution by a smart contract running on a blockchain.

Techniques for data analysis using history-based trustless smart contract execution are disclosed. A private, provable ordered transaction history of a tokenized asset is created. The provable ordered transaction history is based on a plurality of on-chain transactions from one or more blockchains. Creating the provable ordered transaction history can include using a private blockchain data indexer to collect transaction data associated with the on-chain transactions from the blockchains. A decision strategy is developed. The decision strategy is based on the provable ordered transaction history and comprises a program that activates one or more action instructions for a smart contract. The decision strategy can be backtested and optimized based on the backtesting. The decision strategy is deployed on a private centralized oracle and initiates the smart contract on the one or more blockchains. One or more protection parameters can be included in the decision strategy. The protection parameters can be used by the smart contract to validate the action instructions. The one or more action instructions are sent, by the decision strategy that was deployed, to the smart contract. The one or more action instructions are responsive to one or more on-chain transactions. The one or more action instructions are executed by the smart contract. The executing results in at least one new blockchain transaction. Typically, transactions, even on the blockchain, require trust between parties for execution. Because all of the above elements operate on trustless components, a complete trustless system is created that gathers data from blockchains or oracle sources, generates instructions based on that data alone, and executes the instructions from decision strategies by means of a smart contract. All data used in any smart contract execution can be regathered, ordered, and verified at any time, allowing users, auditors, regulators, etc. the ability to reconstruct any executed transaction from the decision strategy, along with all of the conditions related to the execution.

FIG. 1 is a flow diagram for private oracle-based trustless contract execution. Trustless contract execution is enabled by decision strategy which activates validated action instructions for a smart contract. A private, provable ordered transaction history of a tokenized asset is created. The provable ordered transaction history is based on a plurality of on-chain transactions from one or more blockchains. A decision strategy which is based on the provable ordered transaction history is developed. The decision strategy comprises a program that activates one or more action instructions for a smart contract. The decision strategy is deployed on a private centralized oracle and initiates the smart contract on the one or more blockchains. One or more action instructions are sent by the decision strategy that was deployed to the smart contract. The one or more action instructions are responsive to one or more on-chain transactions and are executed by the smart contract, resulting in at least one new blockchain transaction.

The flow 100 includes creating a private, provable ordered transaction history 110 of a tokenized asset. A tokenized asset can be any digital or real-world asset that is represented by a digital token, such as a blockchain-based token. The blockchain-based token can represent ownership rights of the real-world asset. The asset can include a physical asset such as art, collectibles, real estate, bonds, and so on. The asset can be bought, sold, traded, exchanged, etc. In embodiments, the tokenized asset is a cryptocurrency. In embodiments, the private, provable ordered transaction history is based on a plurality of on-chain transactions from one or more blockchains. The one or more blockchains can include a public blockchain, a private blockchain, etc. A blockchain can be a decentralized ledger of one or more blocks linked together. Blocks within the ledger can contain a header, a hash, data associated with a transaction, and so on. A consensus mechanism can be used to ensure security before data is added to the blockchain. The consensus mechanism can include proof of work (PoW), proof of stake (PoS), delegated proof of stake (DPoS), Practical Byzantine Fault Tolerance (PBFT), and so on. Access to the blockchains can be controlled. In embodiments, the one or more blockchains include a proprietary blockchain. In other embodiments, transactions on the proprietary blockchain are not permissionless.

The provable ordered transaction history can include historical information about transactions stored on one or more blocks (called "on-chain" transactions) within one or more blockchains. The on-chain transactions can include a type of transaction, asset information, a buy or sell price, exchange information, a timestamp, and so on. In a usage example, the historical transaction information can include a trade number, an asset identification, an exchange identification, a buy or sell price, and a time stamp. Transaction information can be read from the blockchain with a private blockchain data indexer. A blockchain indexer can be a program that extracts data from a blockchain. The blockchain indexer can transform the data into another useable form. The provable ordered transaction history can include multiple transactions that are included within blocks of more than one blockchain. All of these transactions can be extracted by the private blockchain data indexer. Separate private ordered transaction histories can be created for different blockchains. In embodiments, the provable ordered transaction history includes a start block and an end block. The start block and the end block can refer to the outer blocks of the blockchain user to create the history. In further embodiments, the provable ordered transaction history includes one or more timestamps. The one or more timestamps can include the timestamp of the first block and a time passed until the last block was executed. In other embodiments, the provable ordered transaction history includes a combined hash. A hash function can be a mathematical function that takes an input string of any length and converts it to a fixed-length output string. Any change in the input string can result in a different, unrelated, hashed output string. Hash functions can be used in blockchains to validate the relationship of one data block to another. The combined hash can be based on the one or more blocks from the one or more blockchains which contain the plurality of on-chain transactions. In embodiments, the provable ordered transaction history includes an open-high-low-close (OHLC) candle format, wherein the OHLC candle format includes volume. The OHLC data can be summary data representing a plurality of blocks in the blockchain.

The flow 100 includes developing a decision strategy 120. A decision strategy can be used to determine whether a blockchain transaction should be considered, executed, declined, and so on. The decision strategy can comprise code that executes on a computer, server, oracle, private oracle, etc. The decision strategy can be based on one or more parameters, conditions, requirements, and the like. The decision strategy can comprise a trading strategy which implements predefined rules to buy and sell a tokenized asset. For example, the decision strategy can be based on a momentum trading strategy such as a relative strength index (RSI), moving average convergence/divergence (MACD), and so on. The trading strategy can include technical indicators, such as a moving average, to generate a trading signal. The trading strategy can be based on technical analysis, fundamental analysis, etc. In embodiments, the decision strategy is based on the provable ordered transaction history. Thus, the decision strategy can be designed using data from previous transactions that occurred on one or more blockchains. In embodiments, the decision strategy comprises a program that activates one or more action instructions for a smart contract. A smart contract can be a self-executing agreement with predefined terms. A smart contract can be stored on a blockchain and can execute an agreement automatically when certain conditions are met. The conditions can be agreed to in advance between two parties. The conditions can comprise code on the blockchain. The agreement can occur digitally. The actions for the smart contract can include buy, sell, convert, trade, exchange transactions, and the like. The actions can be performed, by the smart contract, on a blockchain with a tokenized asset. The decision strategy can initiate the smart contract on a block chain.

The one or more decision strategies can be offered to an individual. The individual can include a client, a customer, a potential purchaser, and so on. The offering can be based on one or more models such as a pay-to-play model, a subscription service, and the like. The one or more decision strategies can be associated with the same asset, a collection of assets (e.g., buy the set or collection), a plurality of individual assets, etc. The individual can select a decision strategy well suited to financial goals and planning associated with the individual. The selecting can be based on a recommendation from an expert, friend, etc.

The flow 100 can include backtesting the decision strategy 122. The backtesting can include one or more hypothetical transactions from a decision strategy, such as a decision strategy under development. In embodiments, the backtesting is based on the private, provable ordered transaction history. That is, the backtesting can reflect how the decision strategy would have executed on past data collected from one or more blockchains. The result of the backtesting can include a trading profit, loss, number of transactions, volume, and so on. The decision strategies can be modified, adapted, etc., based on the backtesting. The flow 100 further includes optimizing the one or more decision strategies 124. The optimizing can focus on any factor related to the decision strategy such as a decision cycle (how often the decision strategy checks for data to match certain criteria to execute the action instructions), a number of action instructions sent, and so on. The optimizing can include altering variables within a decision strategy so that trading results are tuned for a given trading pair. In a usage example, an RSI-based decision strategy for bitcoin trading can use an RSI 50/70 indicator (where 50 is the oversold level) rather than a typical RSI 30/70 indicator (where 30 is the oversold level) to tune trading of bitcoin which is trading in a horizontal channel. The optimizing the decision strategies can be used to improve decision strategy performance. The optimizing can be based on volume of trades, maximizing profit, minimizing losses, a maximum drawdown, and so on. The optimizing can match action instructions to produce a certain risk/reward ratio range based on a Sharpe ratio, a Sortino ratio, and so on. The optimizing can focus on more than one factor simultaneously. In embodiments, the optimizing is based on the backtesting. The backtesting can help determine what, if any, changes are required to the decision strategy in order to achieve the optimization goals. The optimizing can include an iterative process of updating the decision strategy and backtesting in order to achieve the desired results.

The flow 100 includes deploying the decision strategy 130 on a private centralized oracle. An oracle can be a service that connects smart contracts running on a blockchain with external data sources ("off-chain" information). The off-chain information can include any external data such as market data, sensor data, weather data, financial data, sports data, and so on. Off-chain data can be written to the blockchain by the private centralized oracle. The private centralized oracle can collect data from one or more blockchains, including transaction data related to a tokenized asset. A private centralized oracle can act as a single entity to prove the above data. The private centralized oracle can be controlled by a user, organization, etc. and can be the sole provider of off-chain data. Since the oracle can be controlled by the same entity that creates the provable ordered transaction history user, the data collected and added on-chain can be trusted. The private centralized oracle can include a human oracle. Human oracles can be responsible for researching information and its authenticity before data is sent to a smart contract. In embodiments, the decision strategy initiates the smart contract 152 on the one or more blockchains. The initiating can include installing code on a blockchain, generating an API key, adding cryptocurrency from a wallet, and so on. As described above, the decision strategy can comprise a trading strategy which implements predefined rules to buy and sell a tokenized asset. The buying and selling can be associated with a user. The wallet can be associated with the user. In embodiments, the decision strategy is immutable. That is, once deployed, the one or more decision strategies cannot be changed or undone except by the user who deployed it. The one or more decision strategies can be cancelled by a user that deployed the decision strategy so that no further blockchain transactions are initiated.

The flow 100 includes sending the one or more action instructions 140, by the decision strategy that was deployed, to the smart contract. When the decision strategy receives data from the private centralized oracle that satisfies certain conditions specified, the decision strategy can send the action instructions to the smart contract. For example, a severe weather condition in a region that produces crops could be collected by the private centralized oracle and used by the decision strategy to send action instructions to a smart contract to sell or buy crop futures positions. In a usage example, a regional conflict could affect trade routes for goods, triggering a decision strategy to place trades to compensate or take advantage of related marketplace changes. In embodiments, the one or more action instructions are responsive to one or more on-chain transactions. The on-chain transactions can be transactions that originated from one or more blockchains. For example, the on-chain transactions can comprise one or more bitcoin trades that occur on a blockchain. If the most recent bitcoin trade exceeded a price limit within the decision strategy, action instructions can be triggered to buy or sell bitcoin. The on-chain transactions can be real-world data, such as sports scores, election results, and so on, that were collected and added on-chain by the private centralized oracle. This data can be used along with other on-chain transaction data from the blockchain to determine when action instructions are to be sent to the blockchain. In embodiments, the developing, the deploying, and the sending include one or more additional decision strategies. The flow 100 includes executing the one or more action instructions 150, by the smart contract. The executing the one or more blockchain transactions can include buying, selling, trading, converting, lending, borrowing, exchanging, etc. one or more assets such as tokenized assets. In embodiments, the executing results in at least one new blockchain transaction. The executing can generate one or more new blockchain blocks. The one or more new blockchain blocks can be added to one or more blockchains.

The flow 100 includes validating, by the smart contract, the one or more action instructions 160. The validating can include checking the action instructions before they are executed by the smart contract. The validation process can use off-chain data from the private centralized oracle to act as a check against external regulations and policies that limit or prohibit any trades included in the action instructions. The validating can help protect against cybersecurity attacks, unauthorized transactions (such as unpaid transactions), and so on. In embodiments, the decision strategy includes one or more protection parameters 126. The protection parameters can be set by a user and can be included in the decision strategy. In embodiments, the validating is based on the one or more protection parameters.

In further embodiments, the one or more protection parameters include a list of allowed exchanges 170. The allowed exchanges can include specific exchanges, geographic locations of the exchanges, etc. The allowed exchanges can include a list of allowed blockchains. In other embodiments, the one or more protection parameters include a list of allowed trading pairs 172. A trading pair can include assets that can be traded each for the other on an exchange. The trading pair, for example Bitcoin/Ether, can establish a comparative value between two cryptocurrencies. In embodiments, the one or more protection parameters include a maximum position size 174. The maximum position size can be based on a physical currency, a cryptocurrency, etc. This can protect the user of the decision strategy from larger trading losses than anticipated. In other embodiments, the one or more protection parameters include a risk score 176. The risk score can be based on a volatility factor associated with an asset. The volatility factor can be based on external factors such as market fluctuations, political unrest, and so on. The risk factor can be based on a risk metric such as the Sharpe ratio, the Sortino ratio, and so on. When the decision strategy detects that a trade would result in a higher ratio than specified in the protection parameters, it can withhold sending the action instructions. In further embodiments, the one or more protection parameters include a quality of trade price information 178. The quality of the trade price information can be based on reputation of a source, corroboration by two or more sources, etc.

The flow 100 includes verifying that the at least one new blockchain transaction 180 was executed according to the decision strategy. The verifying can include comparing the blockchain transactions to the conditions of the decision strategy to ensure that the conditions of the strategy were met. For example, a decision strategy can require five shares of a tokenized asset to be sold when the price of the tokenized asset reaches $100.00. Blockchain transactions can be read to determine what the price of a tokenized asset was at the time the sell order for the related shares was placed by the decision strategy. The transactions can be used to verify the number of shares sold, the prices for which the shares sold, and so on. All of the conditions of the decision strategy can be compared to the blockchain transactions that were generated by the smart contract execution to verify whether they complied with the decision strategy. Off-chain data from the private centralized oracle can be compared to decision strategy requirements in the same way as on-chain transaction data. The off-chain data can be used to verify that the conditions of a decision strategy were met prior to the action instructions being sent to the smart contract for execution. The off-chain data can be written to the blockchain and included in the transaction data by the private centralized oracle. The verifying can include confirming that the one or more blockchains were updated with the most recent transaction data. The verifying can include assembling a transaction history from the provable ordered transaction history. The assembling can be based on the combined hash function. The transaction history can comprise the most recent transaction data included in the at least one new blockchain transaction, historic data, and so on. The assembled transaction history can include one or more transactions executed by a user by the decision strategy.

The verifying can include verifying the provable ordered transaction history. A separate set of blockchain data indexer queries for the tokenized asset can be executed. The data indexer can be a public data indexer. Since the blockchain data from the one or more blockchain sources is immutable, the extracted data from each blockchain data indexer using the same query parameters will be the same. The result of the new data indexer queries can be compared to the provable ordered transaction history. In further embodiments, the executing the one or more blockchain transactions occurs in a trustless fashion. That is, throughout the process, no third party is required to verify the veracity of blockchain data. The decision strategy is immutable, except by the user who initiates it. The oracle is trusted to provide correct data and the smart contract execution of the action instructions can be verified with protection parameters. The provable ordered transaction history, on which the decision strategy can be backtested, can be verified. Thus, disclosures enable trustless transactions between anonymous parties.

The verifying can include testing the accuracy of a deployed version of a smart contract in comparison to a smart contract from which the deployed version is derived. The determining accuracy can include receiving a source code representing a smart contract and using a compiler to generate a bytecode version of the smart contract. The compiled smart contract byte code can be included in a deployed version of the smart contract. A byte code associated with the deployed smart contract can be obtained. The smart contract source code can be recompiled to generate a byte code. The byte codes associated with the smart contract and for the deployed smart contract can be compared. The comparison can determine whether the smart codes are substantially identical, as they should be, or not. The byte codes being substantially identical can indicate that the deployed contract is unaltered when compared to the smart contract.

Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors.

Figure 2:
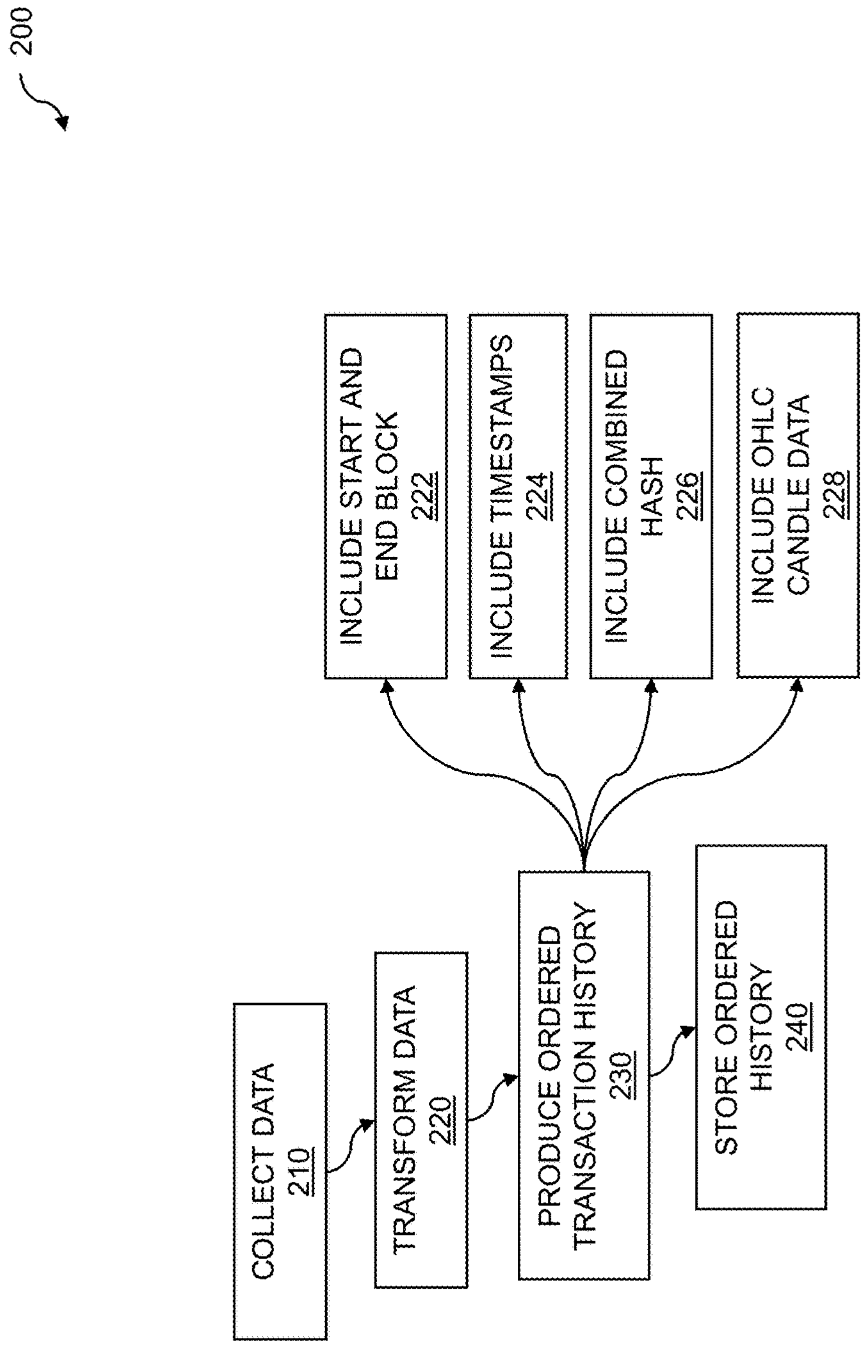
FIG. 2 is a flow diagram for creating a provable ordered transaction history of a tokenized asset.

FIG. 2 is a flow diagram for creating a provable ordered transaction history of a tokenized asset. As described above and throughout, a private, provable ordered transaction history can be based on a plurality of on-chain transactions from one or more blockchains. The provable ordered transaction history can include historical information about transactions stored on one or more blocks of a blockchain. When the historical data is found on the blockchain, it can be referred to as "on-chain" data or "on-chain" transactions. The on-chain transactions can include a type of transaction, asset information, a buy or sell price, exchange information, a timestamp, and so on. The provable ordered transaction history can be private. When private, the provable ordered transaction history can only be accessed by a specified user, group, organization, etc. The user, group, organization, etc. can be a developer of one or more decision strategies. The provable ordered transaction history can be used as a basis for developing a custom decision strategy, backtesting a decision strategy, optimizing a decision strategy, and so on.

The flow 200 includes collecting, from the one or more blockchains, transaction data 210 associated with the plurality of on-chain transactions. The one or more blockchains can include a public blockchain, a private blockchain, a proprietary blockchain, etc. The on-chain transactions can include any transaction that was stored on one or more blocks or any blockchain. For example, the transaction data can include a trade number, an asset identification, an exchange identification, a buy or sell price, and a time stamp. In other embodiments, the plurality of on-chain transactions includes off-chain information that was stored on-chain by one or more oracles. This can include information such as market data, sensor data, weather data, sports data, text, metadata, etc. The transaction data can include the one or more blockchain transactions that were executed by action instructions from a decision strategy.

In further embodiments, the collecting is based on a private blockchain data indexer. A blockchain indexer can be a program that extracts data from a blockchain. Since the data stored on linked blocks within the blockchain can be distributed, the blockchain data indexer can search, filter, locate, etc. data within linked blocks of the blockchain. The blockchain data indexer can be based on The Graph indexing protocol. The blockchain data indexer can include a query language for application programming interfaces (APIs) such as GraphQL. The blockchain indexer can be programmed to access specific data. For example, the indexer can collect all transactions on a blockchain associated with a specific cryptocurrency trading pair, all transactions that have occurred over a timeframe, all transactions of a specific cryptocurrency over a specified volume during a time period, and so on. The blockchain indexer can be private. That is, the data obtained by the blockchain indexer can only be accessed by a specified user, group, organization, etc. This allows for the creation of the private provable ordered transaction history. In embodiments, the creating a private, provable ordered transaction history can include collecting the transaction data. The blockchain indexer can transform the data into another useable form. The provable ordered transaction history can comprise multiple transactions that are included within blocks of more than one blockchain that were extracted by the private blockchain data indexer. Additional private ordered transaction histories can be created for different blockchains.

The flow 200 includes transforming the transaction data 220. The provable ordered transaction history can be created by transforming data collected by the blockchain indexer. The transaction data that was collected can be transformed into any format. For example, in embodiments, the plurality of on-chain transactions comprises a live data feed of the one or more blockchains. This can allow a user to see a real-time stream of transactions that was collected by the indexer, thus helping to gauge real time valuation of a tokenized asset. This information can be used to further optimize a decision strategy designed to trade the tokenized asset. In other embodiments, the transforming produces the provable ordered transaction history 230. The transforming can include data and/or summarize transaction data from a plurality of blocks within one or more blockchains that were collected by the indexer. The transforming can identify a starting block and an ending block from one or more blockchains for which transaction data was collected by the indexer. Thus, in some embodiments, the provable ordered transaction history includes a start block and an end block 222. The transforming can determine one or more timestamps of each transaction. The transforming can identify a starting timestamp within a plurality of blocks and a duration that was required for all transactions that were collected to be executed on the blockchain. Thus, in embodiments, the provable ordered transaction history includes one or more timestamps 224. The one or more timestamps can be based on universal time (e.g., GMT or UTC).

The transforming can include determining a combined hash. A hash function can be a mathematical function that takes an input string of any length and converts it to a fixed-length output string. Any change in the input string can result in a different, unrelated, hashed output string. Hash functions can be used in blockchains to validate the relationship of one data block to another. The combined hash can be based on the one or more blocks from the one or more blockchains which contain the plurality of transaction data that was collected. Thus, in embodiments, the provable ordered transaction history includes a combined hash 226. The combined hash is based on one or more blocks from the one or more blockchains which contain the plurality of on-chain transactions. The transforming can include calculating trade and volume information across a plurality of transactions from a plurality of blockchain blocks. The transforming can consolidate open, close, high, or low trade information across the block chain blocks. In a usage example, the open price can be a price associated with the first trade in the plurality of transactions, and the closing price can be a price associated with the last trade in the plurality of transactions. The high price can include the highest asset price encountered over the plurality of transactions, and the low price can include the lowest price encountered over the plurality of transactions. Thus, in embodiments, the provable ordered transaction history includes an open-high-low-close (OHLC) candle format 228, wherein the OHLC candle format includes volume. The flow 200 includes storing the provable ordered transaction history 240. In further embodiments, the storing is accomplished off chain. The provable ordered transaction history can be stored in a database. The database can include a secure database, a controlled access database, and so on. The database can include a central database, a distributed database, etc. The database can be accessed by a user developing a decision strategy.

Various steps in the flow 200 may be changed in order, repeated, omitted, or the like without departing from the disclosed concepts. Various embodiments of the flow 200 can be included in a computer program product embodied in a non-transitory computer readable medium that includes code executable by one or more processors.

Figure 3:
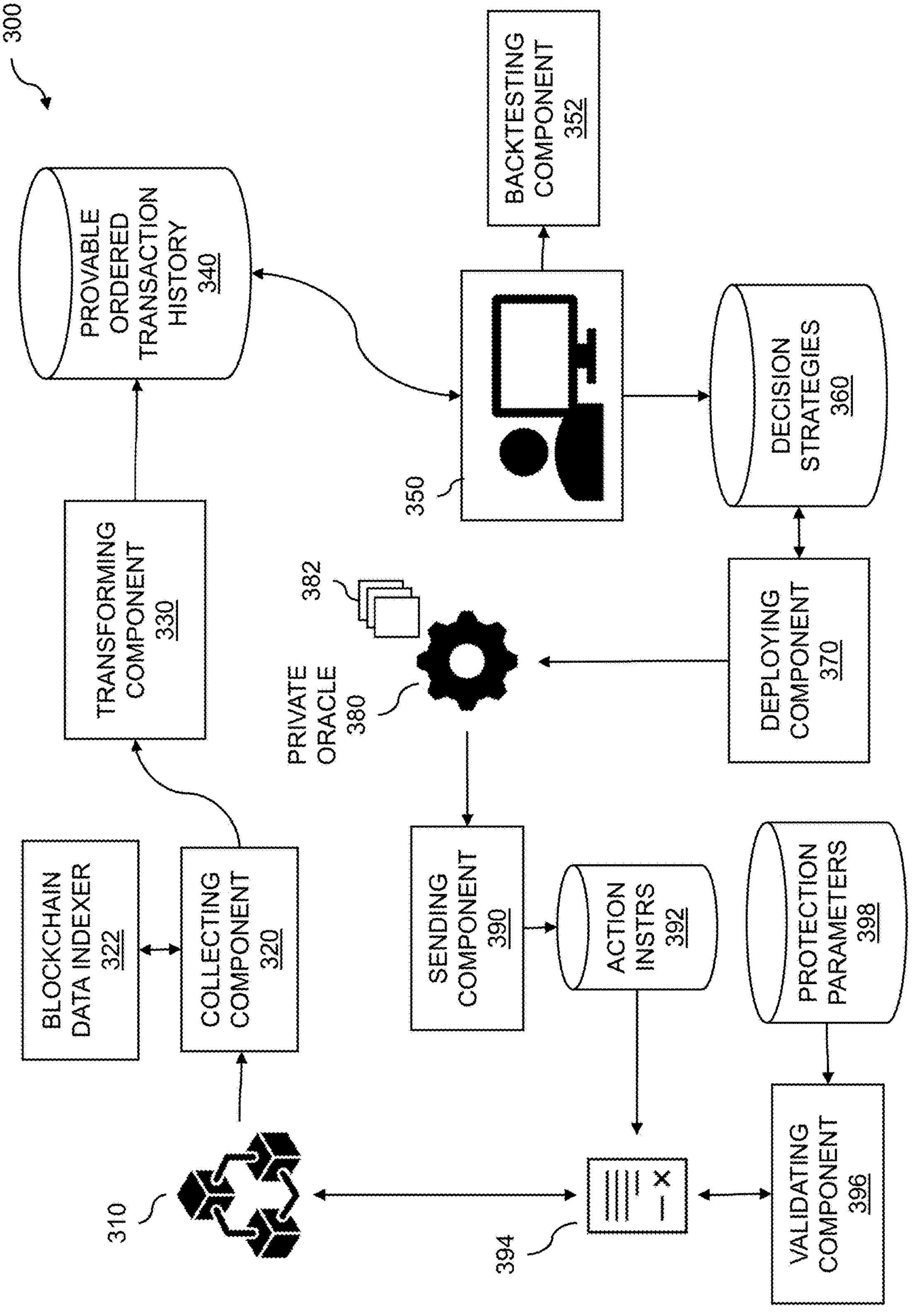
FIG. 3 is an infographic for private oracle-based trustless execution.

FIG. 3 is an infographic for private oracle-based trustless execution. One or more blockchains can be accessed to collect transaction data relating to a tokenized asset. The blockchain data can include price information, volume information, money flow, liquidity, data from live data feeds such as prices or cryptocurrency trading pairs, and so on. The blockchain transaction data can also include start block and end block information, combined hashes based on the blocks from which transaction data was gathered, etc. The transaction data is collected using a private blockchain data indexer, which can collect data from one or more blocks linked in a blockchain. Access to the private blockchain indexer can be controlled. The blockchain transaction data is transformed to produce a provable ordered transaction history. The provable ordered transaction history can be used by a user, developer, individual, group, etc. to generate one or more decision strategies. The decision strategies are programs that generate action instructions for use by a smart contract running on one or more blockchains. The decision strategy can be executed on a private centralized oracle and can initiate a smart contract which runs on one or more blockchains. The private centralized oracle can collect on-chain transaction data from the blockchains and real-world off-chain data from external sources. The private centralized oracle can pass the data collected to the smart contract to include the data on-chain when a transaction is executed. The external data can be weather updates, sports scores, financial information, and so on. As the oracle receives on-chain and/or off-chain data, the decision strategies are reviewed for relevance. When the required conditions of a decision strategy are met, action instructions are sent to the smart contract. The action instructions can be validated. The smart contract executes the action instructions, resulting in one or more transactions which are stored in the blockchain. Since the smart contracts are part of a blockchain, they are immutable. Thus, a complete trustless system is created that gathers data only from blockchains or oracle sources, generates instructions based on that data alone, and executes the instructions from decision strategies by means of a smart contract. All data used in any smart contract execution can be regathered, ordered, and validated at any time, allowing users, auditors, regulators, etc., the ability to reconstruct any decision strategy execution including all of the conditions related to the execution.

The infographic 300 includes a blockchain 310. A blockchain can be a decentralized ledger of one or more blocks linked together. Blocks within the ledger can contain a header, a hash, data associated with a transaction, and so on. A consensus mechanism can be used to ensure security before data is added to the blockchain. The consensus mechanism can include proof of work (PoW), proof of stake (PoS), delegated proof of stake (DPoS), Practical Byzantine Fault Tolerance (PBFT), and so on. Access to the blockchains can be controlled. In embodiments, the one or more blockchains include a proprietary blockchain. In other embodiments, transactions on the proprietary blockchain are not permissionless. The blockchain can include a public blockchain, a private blockchain, and so on. The blockchain can include a blockchain within a plurality of blockchains. The blockchains can be associated with one or more assets such as tokenized assets. In embodiments, the tokenized asset is a cryptocurrency.

The infographic 300 includes a collecting component 320. The collecting component can collect information, from one or more blockchains, on a plurality of transactions. The transactions can be associated with purchasing, selling, trading, etc. a tokenized asset. Embodiments include collecting, from the one or more blockchains, transaction data associated with the plurality of on-chain transactions. The plurality of transactions can include on-chain data. In embodiments, the plurality of on-chain transactions includes off-chain information that was stored on-chain by one or more oracles. The storing can be accomplished by sending the off-chain data to one or more smart contracts that execute a blockchain transaction. In further embodiments, the collecting is based on a private blockchain data indexer 322. As previously described, a private blockchain indexer can be a program that extracts data from a blockchain. Since the data stored on linked blocks within the blockchain can be distributed, the blockchain data indexer can search, filter, locate, etc. data within linked blocks of the blockchain. The private blockchain indexer can be programmed to access specific data from the blockchain. For example, the indexer can collect all transactions on a blockchain associated with a specific cryptocurrency trading pair, all transactions that have occurred over a timeframe, all transactions of a specific cryptocurrency over a specified volume during a time period, and so on. Access to the private blockchain indexer can be controlled. That is, the data obtained by the private blockchain indexer can only be accessed by a specified user, group, organization, etc.

The infographic 300 includes a transforming component 330. Once transaction data is collected via the private blockchain indexer, the data can be transformed. The data can include a plurality of on-chain transactions from one or more blockchains. In embodiments, the plurality of on-chain transactions comprises a live data feed of the one or more blockchains. The transforming can include transaction data and/or summarize transaction data from a plurality of blocks within one or more blockchains that were collected by the private blockchain indexer. Embodiments include transforming the transaction data. In other embodiments, the transforming produces the provable ordered transaction history 340. The provable ordered transaction history includes history information from one or more blocks from the one or more blockchains which contain the plurality of transaction data that was transformed. The transaction data can include identification of one or more trades, tokenized asset identification, exchange identification, a price, a quantity, a timestamp, and so on. The transaction data can be in chronological order. The transaction data can be summarized and/or transformed into a format useful for making decisions about whether to execute a blockchain transaction. In a usage example, an asset can undergo a plurality of trades on a plurality of exchanges. Each trade can include a price and a timestamp. The transforming can include summarizing a plurality of trades into open, high, low, and close (OHLC) data. This information can be used to decide whether to buy, sell, transfer, etc. a tokenized asset. The summarized trade data can include blockchain block numbers, a hash generated from the blockchain blocks, a duration, and so on. Summarized OHLC information can include the range of transaction prices, the duration of time over which the prices changed, and so on. In embodiments, the provable ordered transaction history includes a start block and an end block. In embodiments, the provable ordered transaction history includes one or more timestamps. In embodiments, the provable ordered transaction history includes a combined hash. In other embodiments, the combined hash is based on one or more blocks from the one or more blockchains which contain the plurality of on-chain transactions. In some embodiments, the provable ordered transaction history includes an open-high-low-close (OHLC) candle format. The OHLC candle format can include volume. The provable ordered transaction history can be saved in a database, in parquet data format, or in some other format. Since blockchain transactions are immutable, the transaction data within the provable ordered transaction history can be verified. The verification can use the private data indexer, a public data indexer, or another data indexer with the same query information to compare results between queries.

The infographic 300 includes a user 350. The user can create one or more decision strategies 360. As explained above and throughout, a decision strategy can be used to determine whether a blockchain transaction should be considered, executed, declined, etc. The decision strategy can comprise code that is executed on a computer, server, oracle, distributed oracle network (DON), private centralized oracle, etc. The decision strategy can be based on one or more parameters, conditions, requirements, and the like. The decision strategy can comprise a trading strategy which implements predefined rules to buy and sell a tokenized asset. The decision strategy can be based on the provable ordered transaction history. The decision strategy can comprise a program that activates one or more action instructions for a smart contract. The decision strategy can launch the smart contract, which can run on a blockchain, and can execute an agreement automatically when certain conditions are met. Prior to execution on a private oracle, the decision strategy can be backtested via a backtesting component 352. Embodiments include backtesting the decision strategy. According to some embodiments, the backtesting is based on the provable ordered transaction history. The backtesting can ensure that the decision strategy operates according to the intended design before deployment. Embodiments include optimizing the one or more decision strategies, wherein the optimizing is based on the backtesting.

The infographic 300 includes a deploying component 370. Once the user is satisfied that the decision strategy performs as expected, it can be deployed on a private centralized oracle 380. The deploying can launch one or more smart contracts 394 on one or more blockchains. One or more additional decision strategies 382 can be deployed on the same private centralized oracle. As described earlier, the private centralized oracle can collect on-chain data, as well as off-chain data, from one or more blockchains as well. The data can be sent to the decision strategy to determine if a transaction should be initiated. The private centralized oracle can be controlled by the user and can be the sole provider of the on-chain and off-chain data. Since the oracle can be controlled by the same entity that created the provable ordered transaction history and the decision strategy, the data collected can be trusted. The data collected can be sent to a smart contract which can write it on-chain as part of a completed blockchain transaction.

The infographic 300 includes a sending component 390. When data from the private centralized oracle matches criteria to initiate a transaction, the decision strategy can send one or more action instructions 392 to the smart contract 394 that was launched by the decision strategy running on the private centralized oracle. Before the action instructions are executed by the smart contract, they can be validated by the validating component 396. Embodiments include validating, by the smart contract, the one or more action instructions. In other embodiments, the decision strategy includes one or more protection parameters 398. In further embodiments, the validating is based on the one or more protection parameters. In embodiments, the one or more protection parameters include a list of allowed exchanges. In other embodiments, the one or more protection parameters include a list of allowed trading pairs. In some embodiments, the one or more protection parameters include a maximum position size. In some embodiments, the one or more protection parameters include a risk score. In further embodiments, the one or more protection parameters include a quality of trade price information. Once the action instructions are validated by the protection parameters, the smart contract can execute the transaction on the blockchain.

Figure 4:
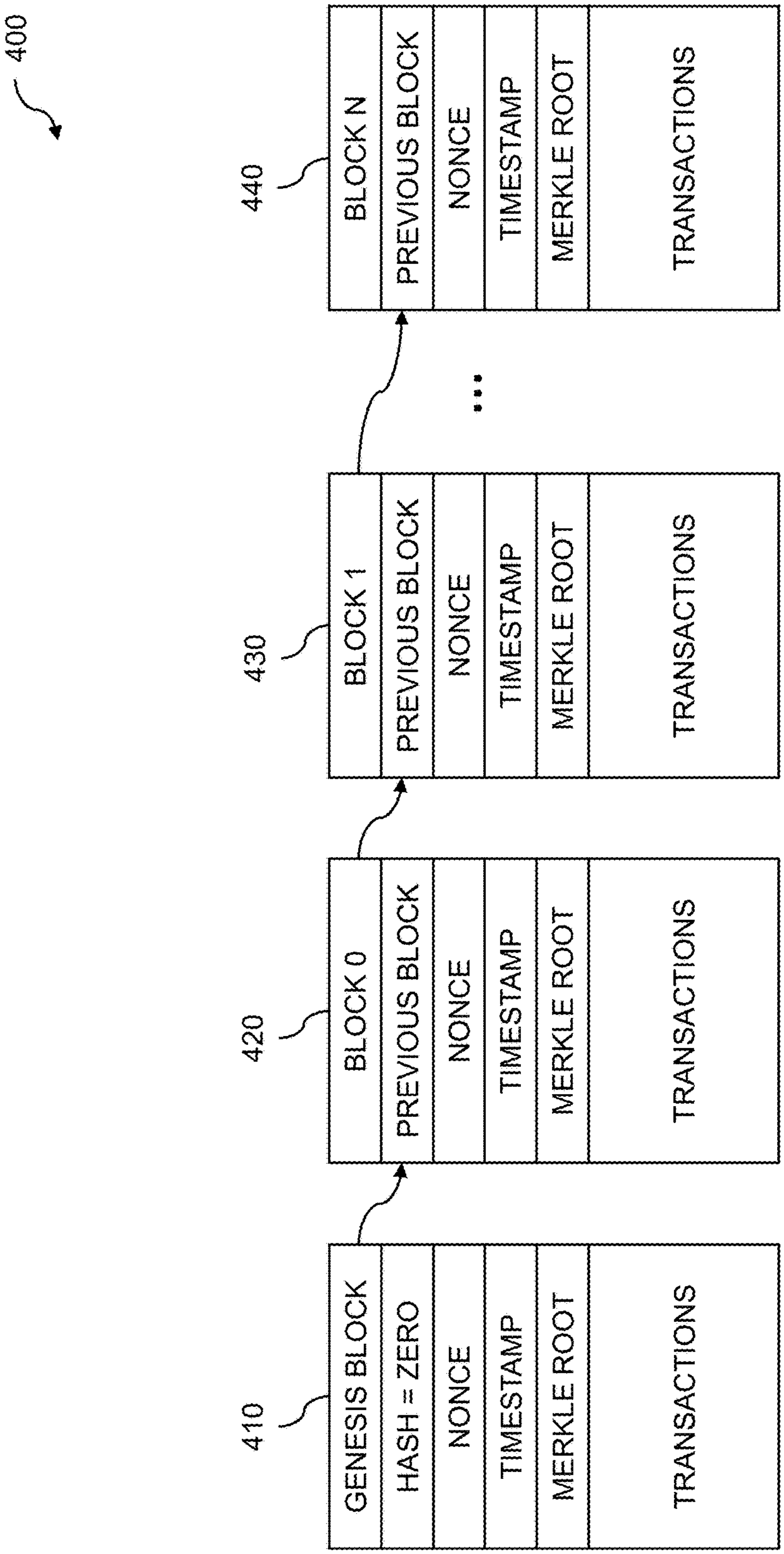
FIG. 4 is a block diagram of a blockchain.

FIG. 4 is a block diagram of a blockchain. Smart contract execution can be enabled by one or more blockchain transactions. The smart contracts can be associated with one or more purchases, sales, etc. of tokenized assets. A tokenized asset can be represented by token based on a blockchain, where the blockchain represents ownership of a digital asset, a right, a physical asset, and so on. The blockchain can be enabled by a distributed digital ledger. All transactions associated with the tokenized asset, such as purchase of or sale of the tokenized asset, are recorded in the blockchain. The transaction history can be used to demonstrate that a seller has the right to sell a tokenized asset, that the buyer of the asset has received the asset, and so on. The blockchain enables private oracle-based trustless smart contract execution.

A blockchain, such as one or more blockchains described herein, can include one or more records. In embodiments, the one or more blockchain records can include one or more blocks. A blockchain block can include one or more transactions. In order for the transactions to be included in the blockchain block, the transactions must be determined to be valid transactions. The blocks can be organized based on a tree configuration such as a Merkle tree. The Merkle tree can be built by hashing one or more transactions. The hashed transactions are further encoded. For a given block within a blockchain, the block includes a hash calculated from a previous block in the blockchain. The previous block can be the immediately preceding block in the blockchain. Blocks within the blockchain are "linked" by a hash generated from the previous block. New blocks, such as blocks corresponding to transactions from a disclosed decision strategy, can be added to the blockchain. Preceding blocks can remain unchanged in order to verify the validity of the blockchain. The addition of a new block is based on a hash generated from the preceding block. Likewise, the addition of the previous block was based on a hash from its preceding block, which was based on a hash of its preceding block, etc. Since the hash of the new block is based on an iteration of hashes from the preceding blocks, validity of the blockchain can be confirmed. In a usage example, the hashes of preceding blocks can be recalculated and compared to hashes stored within blocks. If the computed hashes match the stored hashes, then the blocks within the blockchain can be considered valid. If the computed hashes and the stored hashes differ, then the blockchain can be considered corrupted, tampered with, or otherwise invalid.

The figure shows a block diagram of a blockchain 400. A blockchain can include a genesis block, such as block 410. The genesis block is a basis block from which the blockchain grows. The blockchain grows as transactions associated with the blockchain are executed. The blockchain can include blocks in addition to the genesis block, such as block 0 420, block 1 430, block N 440, and so on. Each block within the blockchain can include key information about the block, information based on a previous block, and so on. Each block within the blockchain can include one or more transactions. Each block can include a hash value based on a previous block, a nonce, a timestamp, and a Merkle root, in addition to the one or more transactions. The hash value for a given block is generated from the hash value obtained from the previous block in the blockchain. The hash equals zero in the genesis block. The nonce is a onetime value that is generated from the data within the block, the hash value from the previous block, a hash for the current block, and other information. The nonce can indicate whether data in the block has changed, because any change in the block information results in a different nonce value. The timestamp can indicate when the block was created, last accessed, changed, and so on. The Merkle root can be calculated by determining a hash of the hashes associated with the blocks of the blockchain. The Merkle root can indicate that the blocks of the blockchain are complete, undamaged, and unaltered. The transaction can include transactions such as blockchain transactions. The transactions can include validated transactions, where the validating of the transactions can be based on one or more protection parameters. The one or more protection parameters can be included in one or more decision strategies.

Figure 5:
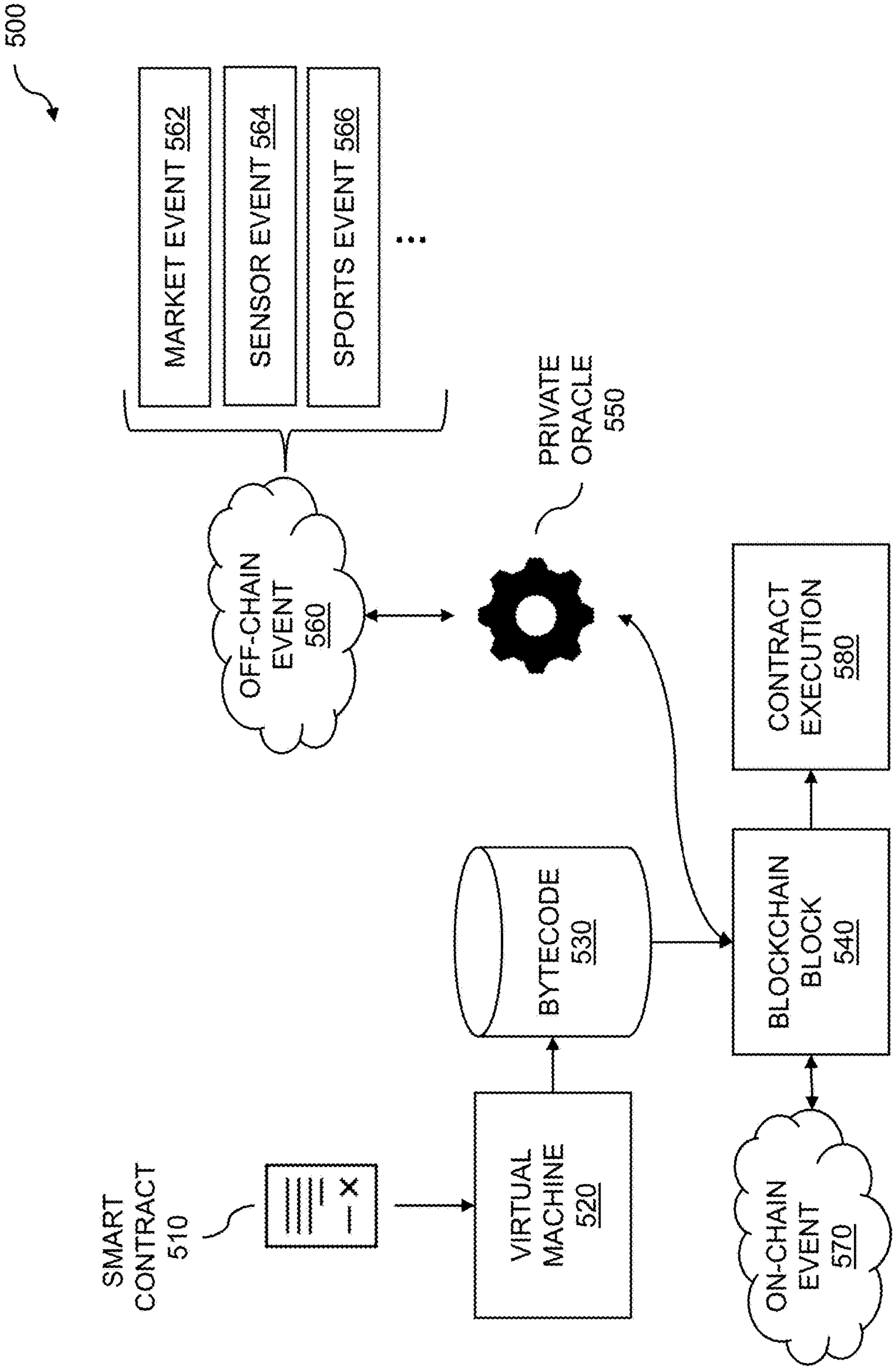
FIG. 5 is a block diagram for smart contract execution on a blockchain.

FIG. 5 is a block diagram for smart contract execution on a blockchain. A smart contract can include a program, such as a self-executing program, that can be executed on a blockchain based on meeting one or more requirements. The one or more requirements can include transferring funds, meeting a decision strategy, meeting one or more protection parameters, and so on. Smart contract execution can automate one or more actions required by the contract. The smart contract can be used to enable trusted transactions among parties. The parties can include anonymous, disparate, widely dispersed, etc. parties. The transaction can be executed without a central authority. The smart contract can enable the transaction to be executed automatically. The transaction execution can further be accomplished outside of legal systems and enforcement mechanisms. The transactions are traceable via one or more blockchains and are irreversible. Smart contract execution is enabled by private oracle-based trustless smart contract execution.

As explained above and throughout, a user can develop one or more decision strategies (not shown). A decision strategy can be designed to make a decision, such as a transaction decision, based on available data. The available data can include diverse types of on-chain and off-chain data such as transactional data, market data, sensor data, weather data, sports data, etc. The decision strategy can launch a smart contract 510. The smart contract can execute on one or more blockchains. When the data received by the decision strategy meets certain conditions (as specified in the decision strategy), one or more action instructions can be sent to the smart contract for execution. The action instructions can include transactions for a tokenized asset such as buy, sell, transfer, etc. In embodiments, the tokenized asset is a cryptocurrency. The block diagram 500 includes a virtual machine 520. The virtual machine can enable contracts such as smart contracts to interact with each other. The virtual machine can include code for the smart contract which can be compiled to create a bytecode 530. The bytecode can include the instructions for the smart contract which are executed on the one or more blockchains.

The block diagram 500 includes a private centralized oracle 550. As described above, a private centralized oracle can be a service that provides external data sources for a blockchain, a blockchain transaction, a smart contract, and so on. This can connect off-chain data to smart contract bytecodes running on a blockchain. The external data sources can be called off-chain events 560. An off-chain event can occur that relates to any type of real-world data that can be written to a blockchain block 540 by the private centralized oracle. Examples include a market event 562 (such as the rise or fall of the price of an asset), a sensor event 564 (such as an indication that a temperature in a certain location has fallen below a threshold), a sports event 566 (such as a specific team winning a championship), and so on. The private centralized oracle can collect information pertaining to the off-chain event and send it to the smart contract. The smart contract can write the off-chain data to one or more blocks of the blockchain when executing a valid blockchain transaction. The private oracle can be trusted since it can be controlled by the same entity that developed and launched the decision strategy which can execute on the private centralized oracle. The decision strategy, which can be executed on the private centralized oracle, can also have access to the off-chain information. If the information matches certain conditions specified by the decision strategy, one or more action instructions can be sent to the smart contract running on the blockchain. In a usage example, a severe weather condition in a region that produces crops could be detected by the private centralized oracle and used by the decision strategy to send action instructions to a smart contract to sell or buy crop futures positions.

The block diagram 500 includes on-chain events 570. The on-chain events can include blockchain transactions such as one or more of a purchase, sale, trade, exchange, conversion, and so on. The on-chain event can cause one or more blocks to be added to the blockchain. Thus, the blockchain can contain both on-chain and off-chain data which can form inputs to the decision strategy. The private centralized oracle can have access to both on-chain and off-chain data to support the decision strategy. The block diagram 500 includes contract execution 580. The contract execution can include the smart contract. The execution can occur automatically when the conditions specified in the decision strategy are met. In embodiments, the executing results in at least one new blockchain transaction. In embodiments, the executing the at least one new blockchain transaction occurs in a trustless fashion. In other embodiments, the decision strategy is immutable. That is, once contract execution takes place, it cannot be undone. By preventing transactions from being undone, the integrity of a history of transactions associated with a blockchain can be ensured to be unaltered, complete, and so on. Embodiments include verifying that the at least one new blockchain transaction was executed according to the decision strategy. The verifying can include comparing the blockchain transactions to the conditions of the decision strategy to ensure that the conditions of the strategy were met.

Figure 6:
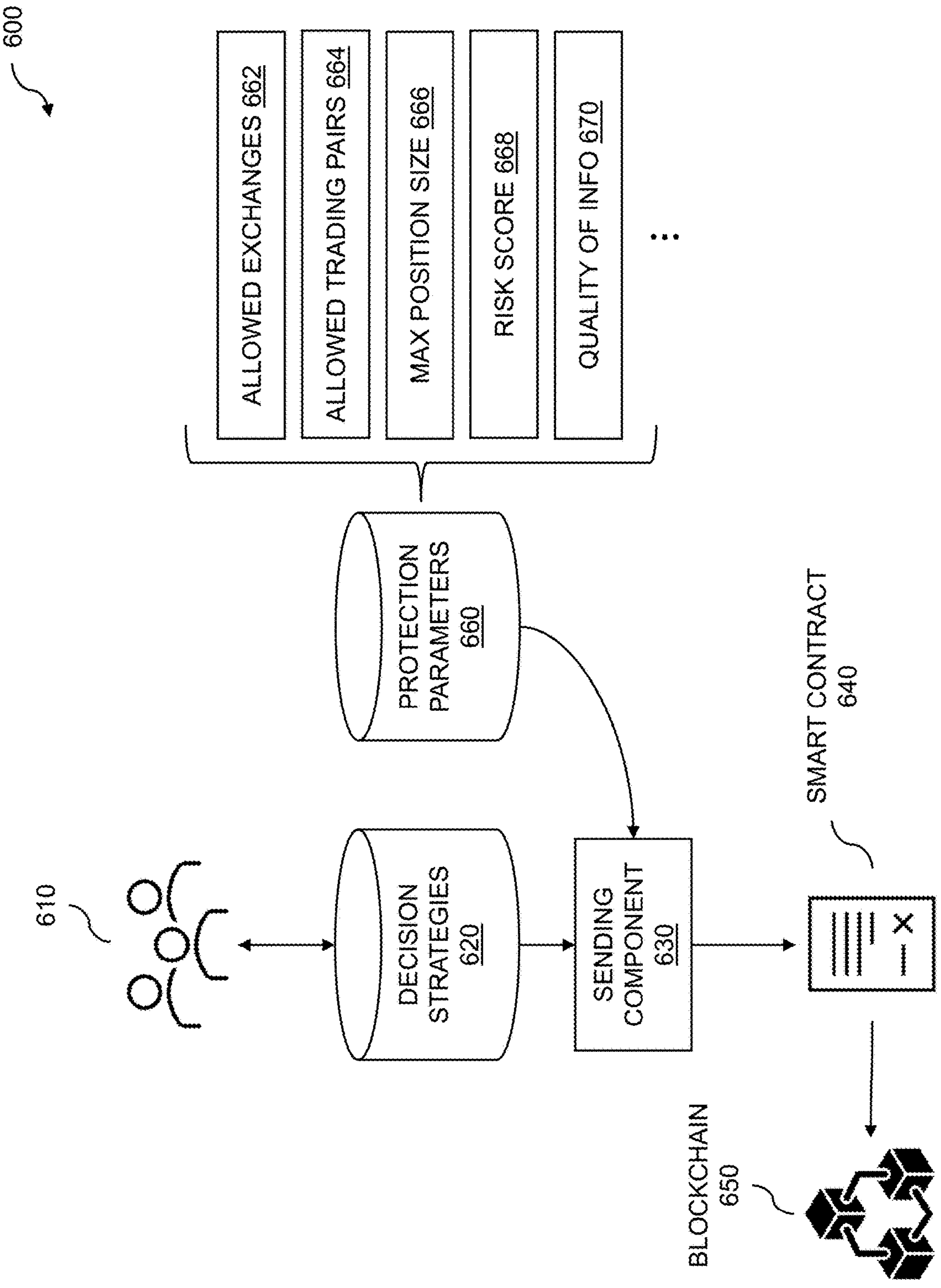
FIG. 6 is an infographic for securing a blockchain transaction.

FIG. 6 is an infographic for securing a blockchain transaction. The securing can enable trustless transaction execution. The securing can be based on one or more protection parameters which can be specified in a decision strategy. Before execution of action instructions by a smart contract, the instructions can be validated by the protection parameters. The validation process can use on-chain data. The validation process can use off-chain data from the private centralized oracle to act as a check against external regulations and policies that limit or prohibit any trades included in the action instructions. The validating can help protect against cybersecurity attacks, unauthorized transactions (such as unpaid transactions), and so on.

The infographic 600 includes a user 610. The user can be an individual, a group, an organization, and so on. The user can develop one or more decision strategies 620. As described earlier, the decision strategies can be based on a provable ordered transaction history of a tokenized asset. Once developed, the decision strategy can be backtested against the provable ordered transaction history to ensure it performs according to the user's specifications. The decision strategy can be deployed on a private centralized oracle and can initiate one or more smart contracts 640 on one or more blockchains. When off-chain or on-chain data meets certain criteria defined in the decision strategy, the decision strategy can send, via a sending component 630, one or more action instructions to the smart contract running on the one or more blockchains 650. Funds can be transferred to the smart contract from a blockchain wallet owned by the user to enable automatic contract execution. Automatic contract execution can also be enabled through the use of an on-chain wallet for decentralized exchanges. The decision strategy can include the on-chain wallet. Funds can be sent from an off-chain wallet owned by the user to the on-chain wallet. The on-chain wallet can be under the control of the user. When executed, the action instructions can trigger at least one new blockchain transaction such as buying, selling, trading, converting, exchanging, etc. one or more tokenized assets. The one or more blockchain transactions can generate one or more new blockchain blocks. In embodiments, the executing the at least one new blockchain transaction occurs in a trustless fashion. That is, no third party is required to verify the veracity of the blockchain when the one or more blockchain transactions are executed. The one or more new blockchain blocks can be added to blockchains on which the transaction executed.

Before execution by the smart contract, the action instructions can be validated with protection parameters 660. Thus, in embodiments, the executing includes validating, by the smart contract, the one or more action instructions. In further embodiments, the validating is based on the one or more protection parameters. Any number of protection parameters can be included in the decision strategy to check action instructions prior to irreversible execution on a blockchain. In embodiments, the one or more protection parameters include a list of allowed exchanges 662. The list of allowed exchanges can include specific exchanges, geographic locations of the exchanges, etc. The allowed exchanges can include a list of allowed blockchains. In other embodiments, the one or more protection parameters include a list of allowed trading pairs 664. A trading pair can include assets that can be traded each for the other on an exchange. The trading pair, for example Bitcoin/Ether, can establish a comparative value between two cryptocurrencies. In embodiments, the one or more protection parameters include a maximum position size 666. The maximum position size can be based on a physical currency, a cryptocurrency, etc. This can protect the user of the decision strategy from larger trading losses than anticipated. In other embodiments, the one or more protection parameters include a risk score 668. The risk score can be based on a volatility factor associated with an asset. The volatility factor can be based on external factors such as market fluctuations, political unrest, and so on. The risk factor can be based on a risk metric such as the Sharpe ratio, the Sortino ratio, and so on. When the decision strategy detects that a trade would result in a higher ratio than specified in the protection parameters, it can withhold sending the action instructions. In further embodiments, the one or more protection parameters includes a quality of trade price information 670. The quality of the trade price information can be based on reputation of a source, corroboration by two or more sources, etc. Additional protection parameters can be included, such as a number of transactions, a valid timeframe to allow transactions, and so on. The protection parameters can be used to secure the at least one new blockchain transaction and prevent unauthorized or hacked transactions.

Figure 7:
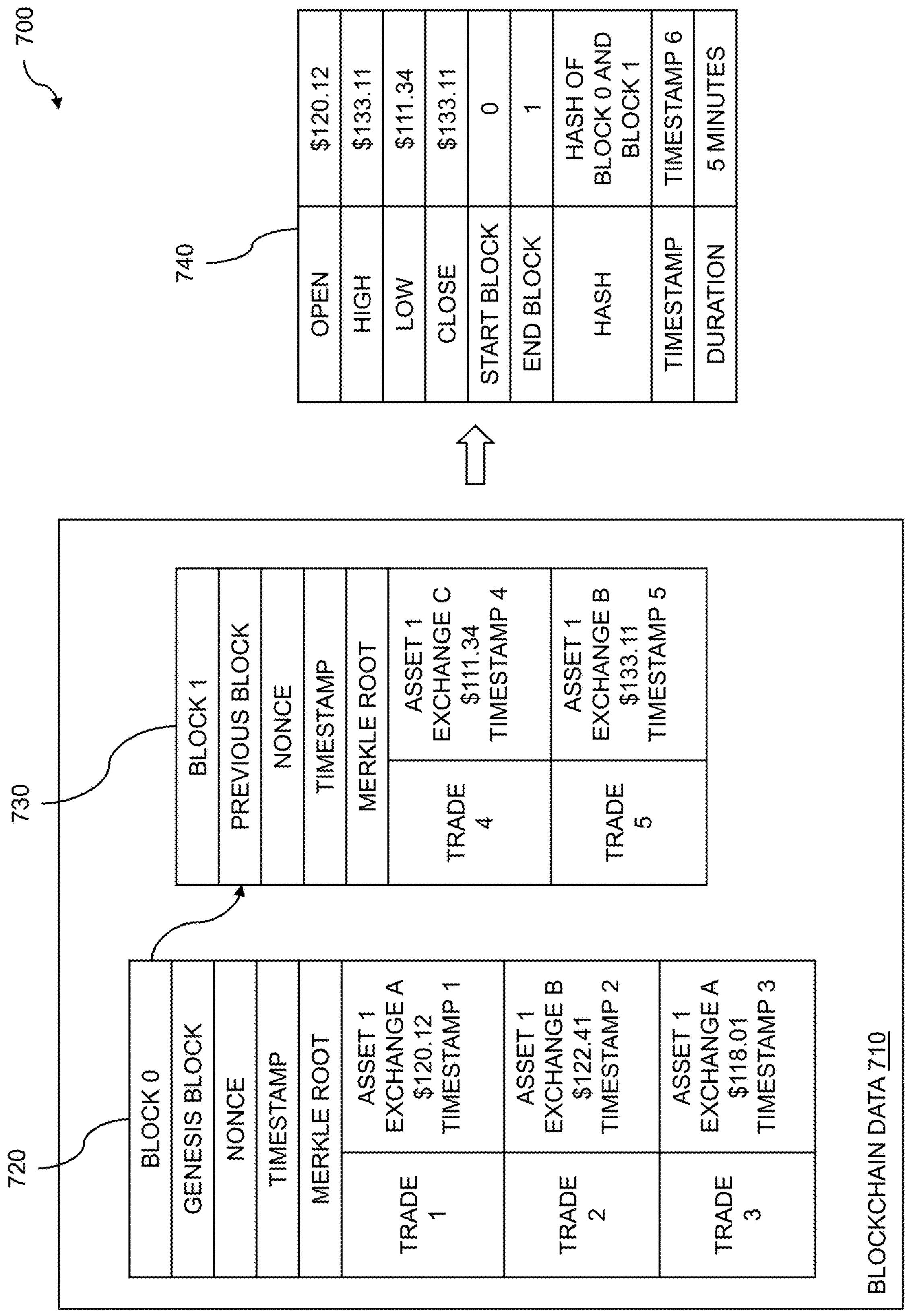
FIG. 7 is a block diagram for creating an ordered transaction history.

FIG. 7 is a block diagram for creating an ordered transaction history. Information can be collected from one or more blockchains. The information can include a plurality of transaction data for a tokenized asset. The collecting information can be based on a private blockchain data indexer. The information can be transformed into a provable ordered transaction history. Embodiments include storing the provable ordered transaction history. In embodiments, the storing is accomplished off chain. The provable ordered transaction history can be saved in a database, in parquet data format, or in some other format. The provable ordered transaction history can include history information from one or more blocks from the one or more blockchains which contain the plurality of transaction data that was transformed. One or more decision strategies which are based on the provable ordered transaction history can be developed by a user.

The block diagram 700 can include blockchain data 710. The example blockchain includes two blocks, block 0 720 and block 1 730. Block 0 can be a genesis block. Block 1 can be a successor block to block 0. Each block in the blockchain can include a hash based on a previous block. If block 0 is the genesis block for the blockchain 710, then the hash value is zero. The previous block hash associated with block 1 can be based on the hash associated with block 1. Each block in the blockchain can include a nonce. The nonce is a one-time value that is generated based on a variety of information. The nonce can be generated based on the data within the block, the hash value from the previous block, a hash for the current block, and other information. Each block within the blockchain can include a timestamp. The timestamp can include a time based on Universal Time (e.g., GMT or UTC), local time, a time reference, etc. Each block in the blockchain can include a Merkle root. The Merkle root can be calculated based on determining a hash value. The hash can be based on determining a hash of the hashes associated with the blocks of the blockchain.

Each block within the blockchain can include data specific to a blockchain. The data can include transaction data such as trade data. In block diagram 700, the transaction data associated with block 0 can include transaction information associated with an asset such as asset 1. The asset can be a tokenized asset. In embodiments the tokenized asset is a cryptocurrency. The transaction data can be associated with trading the asset on one or more exchanges, blockchains, etc. The transaction data can include trade 1 of asset 1 on exchange A, trade 2 of asset 1 on exchange B, and trade 3 of asset 1 on exchange A. The transaction data can further include a price, a timestamp, and so on. Further transaction data can be associated with block 1. The transaction data associated with block 1 can be associated with an asset such as asset 1. Transaction data within block 1 can include trade 4 of asset 1 on exchange C, and trade 5 of asset 1 on exchange B. The transaction data associated with block 1 can further include a price, a timestamp, and so on.

The transaction data can be collected from one or more blockchains. In embodiments, the one or more blockchains include a proprietary blockchain. As described previously, the collecting the transaction data can be based on a private centralized blockchain oracle, which can enable a connection between the blockchain and external data sources. The external data sources can include market data, sensor data, sports data, political data, weather data, and so on. The private centralized oracle can enable execution of one or more smart contracts based on external data sources. The execution of the smart contracts can be based on commands, parameters such as protection parameters, and so on. The transaction data collected by the private centralized blockchain oracle can be used for multiple purposes. Embodiments include transforming the transaction data. In other embodiments, the transforming produces the provable ordered transaction history 740.

The ordered transaction history can show key information associated with transactions corresponding to a tokenized asset. In embodiments, the provable ordered transaction history includes a start block and an end block. The start block and end block can be the starting and ending blocks on the blockchain from which transaction data was collected. In block diagram 700, the provable ordered transaction history includes start block 0 and the end block 1. In other embodiments, the provable ordered transaction history includes one or more timestamps. In block diagram 700, the provable ordered transaction history includes timestamp 6. The timestamp in the provable ordered transaction history can be based on a duration. For example, the timestamp can be the same time as the first transaction in the first block (in this case, block 0 at timestamp 1). The duration can be a calculation of how long it took for all transactions collected in the provable ordered transaction history to execute. This can be calculated as timestamp 5, less timestamp 1. In the example of block diagram 700, the duration is 5 minutes. In further embodiments, the provable ordered transaction history includes an open-high-low-close (OHLC) candle format. In the block diagram 700, the provable ordered transaction history shows an open price of $120.12. This can refer to the first transaction price in the first block of transaction data that was collected (block 0). The provable ordered transaction history shows a close price of $133.11. This can refer to the last transaction price in the last block of transaction data that was collected (block 1). The provable ordered transaction history shows a high price of $133.11. This can refer to the highest transaction price in any block of transaction data that was collected (in block 0 and block 1). The provable ordered transaction history shows a low price of $111.34. This can refer to the lowest transaction price in any block of transaction data that was collected (in block 0 and block 1). In embodiments, the OHLC candle format includes volume. Though not shown, each transaction can include a number of tokenized assets associated with each transaction. This can be reflected in the provable ordered transaction history as a total volume, average volume, and so on. In embodiments, the provable ordered transaction history includes a combined hash. In further embodiments, the combined hash is based on one or more blocks from the one or more blockchains which contain the plurality of on-chain transactions. In the case of the transaction history 740, the hash is shown as a combined hash of block 0 and block 1.

Figure 8:
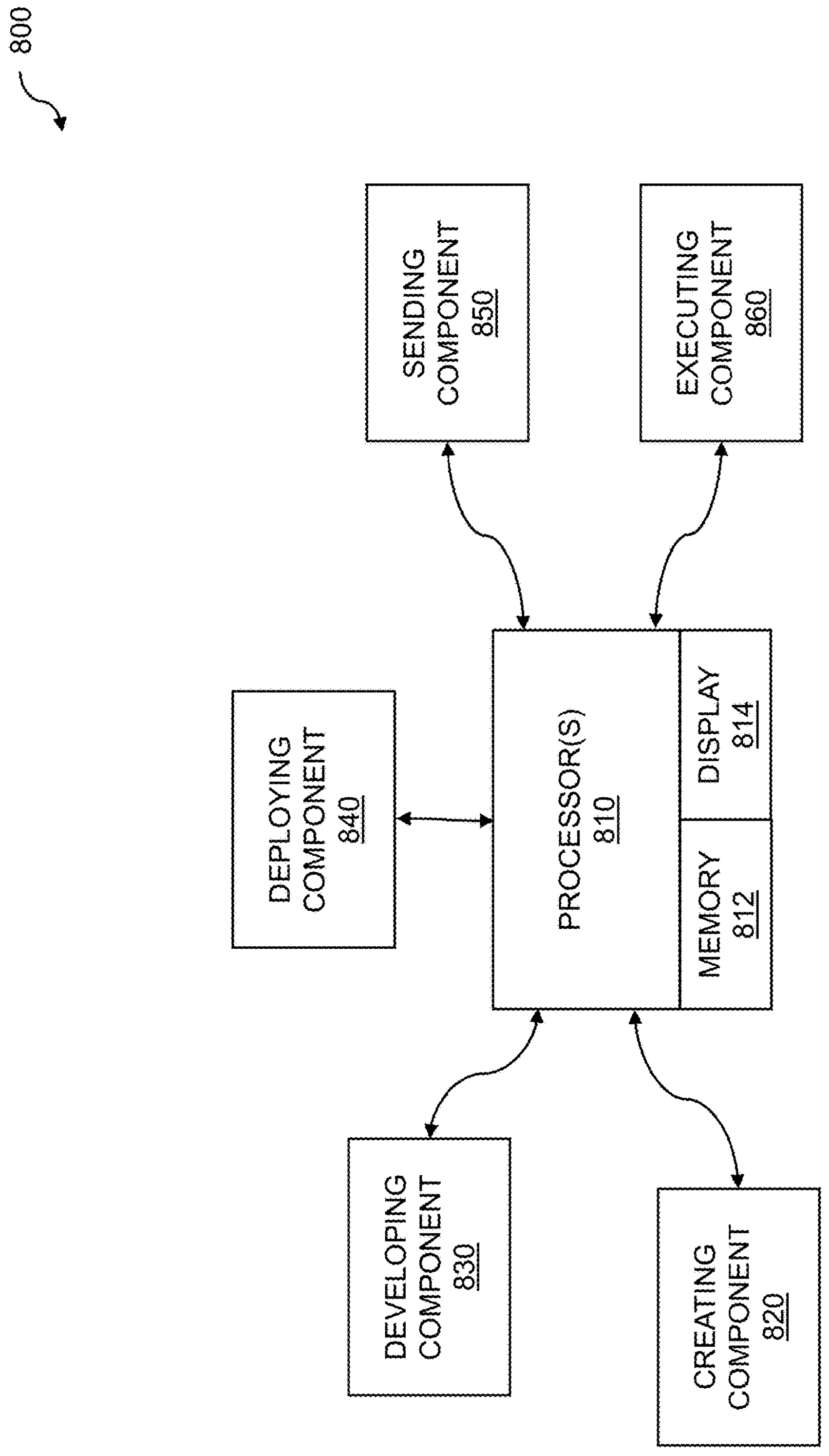
FIG. 8 is a system diagram for private oracle-based trustless contract execution.

FIG. 8 is a system diagram for private oracle-based trustless execution. The system 800 can include one or more processors 810, which are coupled to a memory 812 which stores instructions. The system 800 can further include a display 814 coupled to the one or more processors for displaying data, intermediate steps, transaction data, blockchains, and so on. In embodiments, one or more processors 810 are coupled to the memory 812, wherein the one or more processors, when executing the instructions which are stored, are configured to: create a private, provable ordered transaction history of a tokenized asset, wherein the provable ordered transaction history is based on a plurality of on-chain transactions from one or more blockchains; develop a decision strategy, wherein the decision strategy is based on the provable ordered transaction history, wherein the decision strategy comprises a program that activates one or more action instructions for a smart contract; deploy the decision strategy on a private centralized oracle, wherein the decision strategy initiates the smart contract on the one or more blockchains; send the one or more action instructions, by the decision strategy that was deployed, to the smart contract, wherein the one or more action instructions are responsive to one or more on-chain transactions; and execute the one or more action instructions, by the smart contract, wherein executing results in at least one new blockchain transaction.

The system 800 includes a creating component 820. The creating component can include functions and instructions for creating a private, provable ordered transaction history of a tokenized asset, wherein the provable ordered transaction history is based on a plurality of on-chain transactions from one or more blockchains. The provable ordered transaction history can include historical information about transactions stored on one or more blocks within one or more blockchains. The on-chain transactions can include a type of transaction, asset information, a buy or sell price, exchange information, a timestamp, and so on. Transaction information can be read from the blockchain via a private blockchain data indexer. The provable ordered transaction history can comprise multiple transactions that are included within blocks of more than one blockchain. Separate private ordered transaction histories can be created for different blockchains. The transaction data can be transformed. The transforming can produce the provable ordered transaction history. The provable ordered transaction history can include a start block and an end block, one or more timestamps, a combined hash, an open-high-low-close (OHLC) candle format, and so on. The provable ordered transaction history can be verified. A separate set of queries for the tokenized asset can be executed on a second data indexer. The second data indexer can be a public data indexer. Since the blockchain data from the one or more blockchain sources is immutable, the extracted data from the second data indexer using the same query parameters will be the same as the private blockchain data indexer. The result of the new data indexer queries can be compared to the transaction data within the provable ordered transaction history.

The system 800 includes a developing component 830. The developing component can include functions and instructions for developing a decision strategy, wherein the decision strategy is based on the provable ordered transaction history, wherein the decision strategy comprises a program that activates one or more action instructions for a smart contract. A decision strategy can be used to determine whether a blockchain transaction should be considered, executed, declined, and so on. The decision strategy can comprise code that executes on a computer, server, oracle, private oracle, etc. The decision strategy can be based on one or more parameters, conditions, requirements, and the like. The decision strategy can comprise a trading strategy which implements predefined rules to buy and sell a tokenized asset. The decision strategy can be based on technical analysis, fundamental analysis, etc. The decision strategy can be based on the provable ordered transaction history. Thus, the decision strategy can be designed using data from previous transactions that occurred on one or more blockchains. The decision strategy can comprise a program that activates one or more action instructions for a smart contract including buy, sell, convert, trade, exchange, and the like. The actions can be performed, by the smart contract, on a blockchain associated with a tokenized asset. The decision strategy can initiate the smart contract on a block chain.

The system 800 includes a deploying component 840. The deploying component can include functions and instructions for deploying the decision strategy on a private centralized oracle, wherein the decision strategy initiates the smart contract on the one or more blockchains. The decision strategy can comprise a trading strategy which implements predefined rules to buy and sell a tokenized asset. The buying and selling can be associated with a user, one or more transactions on a blockchain, and so on. Once deployed, the decision strategy is immutable. That is, the decision strategy cannot be changed or undone except by the user who deployed it. The decision strategy can be cancelled by a user that deployed the decision strategy so that no further blockchain transactions are initiated. The decision strategy can be run on the private centralized oracle. The decision strategy can initiate one or more smart contracts that can be executed on one or more blockchains. The initiating can include installing code on a blockchain, generating an API key, adding cryptocurrency from a wallet, and so on.

The system 800 includes a sending component 850. The sending component can include functions and instructions for sending the one or more action instructions, by the decision strategy that was deployed, to the smart contract, wherein the one or more action instructions are responsive to one or more on-chain transactions. When the decision strategy receives data from a private centralized oracle that satisfies certain conditions specified, the decision strategy can send the action instructions to the smart contract. The one or more action instructions can be responsive to one or more on-chain transactions. The on-chain transactions can be transactions that originated from one or more blockchains. The on-chain transactions can comprise real-world data that was sourced by the private centralized oracle, such as sports scores, election results, and so on. This data can be used along with other on-chain transaction data from the blockchain to determine when action instructions are to be sent to the blockchain. In embodiments, the developing, the deploying, and the sending include one or more additional decision strategies.

The system 800 includes an executing component 860. The executing component can include functions and instructions for executing the one or more action instructions, by the smart contract, wherein the executing results in at least one new blockchain transaction. The executing the one or more blockchain transactions can include buying, selling, trading, converting, lending, borrowing, exchanging, etc. one or more assets such as tokenized assets. The executing can result in at least one new blockchain transaction. The executing can generate one or more new blockchain blocks. The one or more new blockchain blocks can be added to one or more blockchains.

The system 800 can include a computer program product embodied in a non-transitory computer readable medium for data analysis, the computer program product comprising code which causes one or more processors to perform operations of: creating a private, provable ordered transaction history of a tokenized asset, wherein the provable ordered transaction history is based on a plurality of on-chain transactions from one or more blockchains; developing a decision strategy, wherein the decision strategy is based on the provable ordered transaction history, wherein the decision strategy comprises a program that activates one or more action instructions for a smart contract; deploying the decision strategy on a private centralized oracle, wherein the decision strategy initiates the smart contract on the one or more blockchains; sending the one or more action instructions, by the decision strategy that was deployed, to the smart contract, wherein the one or more action instructions are responsive to one or more on-chain transactions; and executing the one or more action instructions, by the smart contract, wherein the executing results in at least one new blockchain transaction.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams show functions, steps, or groups of steps of the methods, apparatus, systems, computer program products and/or computer-implemented methods. Any and all such functions generally referred to herein as a "circuit," "module," or "system" may be implemented by computer program instructions, by special-purpose hardware-based computer systems, by combinations of special purpose hardware and computer instructions, by combinations of general-purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited to neither conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM); an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States, then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A processor-implemented method for data analysis comprising:

creating a private, provable ordered transaction history of a tokenized asset, wherein the provable ordered transaction history is based on a plurality of on-chain transactions from one or more blockchains, and wherein the creating includes collecting, from the one or more blockchains, transaction data associated with the plurality of on-chain transactions, wherein the collecting is based on a private blockchain data indexer;

developing a decision strategy, wherein the decision strategy is based on the provable ordered transaction history, wherein the decision strategy comprises a program that activates one or more action instructions for a smart contract;

deploying the decision strategy on a private centralized oracle, wherein the decision strategy initiates the smart contract on the one or more blockchains;

sending the one or more action instructions, by the decision strategy that was deployed, to the smart contract, wherein the one or more action instructions are responsive to one or more on-chain transactions; and executing the one or more action instructions, by the smart contract, wherein the executing results in at least one new blockchain transaction.

2. The method of claim 1 further comprising transforming the transaction data, wherein the transforming produces the provable ordered transaction history.

3. The method of claim 2 wherein the provable ordered transaction history includes a start block and an end block.

4. The method of claim 2 wherein the provable ordered transaction history includes one or more timestamps.

5. The method of claim 2 wherein the provable ordered transaction history includes a combined hash, wherein the combined hash is based on one or more blocks from the one or more blockchains which contain the plurality of on-chain transactions.

6. The method of claim 2 further comprising storing the provable ordered transaction history, wherein the storing is accomplished off chain.

7. The method of claim 1 further comprising backtesting the decision strategy, wherein the backtesting is based on the provable ordered transaction history.

8. The method of claim 7 further comprising optimizing the one or more decision strategies, wherein the optimizing is based on the backtesting.

9. The method of claim 1 further comprising verifying that the at least one new blockchain transaction was executed according to the decision strategy.

10. The method of claim 1 wherein the plurality of on-chain transactions includes off-chain information that was stored on-chain by one or more oracles.

11. The method of claim 1 wherein the plurality of on-chain transactions comprises a live data feed of the one or more blockchains.

12. The method of claim 1 wherein the provable ordered transaction history includes an open-high-low-close (OHLC) candle format, wherein the OHLC candle format includes volume.

13. The method of claim 1 wherein the tokenized asset is a cryptocurrency.

14. The method of claim 1 wherein the decision strategy includes one or more protection parameters.

15. The method of claim 14 wherein the executing includes validating, by the smart contract, the one or more action instructions, wherein the validating is based on the one or more protection parameters.

16. The method of claim 15 wherein the one or more protection parameters include a list of allowed exchanges.

17. The method of claim 15 wherein the one or more protection parameters include a list of allowed trading pairs.

18. The method of claim 15 wherein the one or more protection parameters include a maximum position size.

19. The method of claim 15 wherein the one or more protection parameters include a risk score.

20. The method of claim 15 wherein the one or more protection parameters include a quality of trade price information.

21. The method of claim 1 wherein the developing, the deploying, and the sending include one or more additional decision strategies.

22. The method of claim 1 wherein the one or more blockchains include a proprietary blockchain.

23. The method of claim 22 wherein transactions on the proprietary blockchain are not permissionless.

24. The method of claim 1 wherein the decision strategy is immutable.

25. The method of claim 1 wherein the executing the at least one new blockchain transaction occurs in a trustless fashion.

26. A computer program product embodied in a non-transitory computer readable medium for instruction execution, the computer program product comprising code which causes one or more processors to perform operations of:

creating a private, provable ordered transaction history of a tokenized asset, wherein the provable ordered transaction history is based on a plurality of on-chain transactions from one or more blockchains, and wherein the creating includes collecting, from the one or more blockchains, transaction data associated with the plurality of on-chain transactions, wherein the collecting is based on a private blockchain data indexer;

developing a decision strategy, wherein the decision strategy is based on the provable ordered transaction history, wherein the decision strategy comprises a program that activates one or more action instructions for a smart contract;

deploying the decision strategy on a private centralized oracle, wherein the decision strategy initiates the smart contract on the one or more blockchains;

sending the one or more action instructions, by the decision strategy that was deployed, to the smart contract, wherein the one or more action instructions are responsive to one or more on-chain transactions; and executing the one or more action instructions, by the smart contract, wherein the executing results in at least one new blockchain transaction.

27. A computer system for instruction execution comprising:

a memory which stores instructions;

one or more processors coupled to the memory wherein the one or more processors, when executing the instructions which are stored, are configured to:

create a private, provable ordered transaction history of a tokenized asset, wherein the provable ordered transaction history is based on a plurality of on-chain transactions from one or more blockchains, and wherein the creating includes collecting, from the one or more blockchains, transaction data associated with the plurality of on-chain transactions, wherein the collecting is based on a private blockchain data indexer;

develop a decision strategy, wherein the decision strategy is based on the provable ordered transaction history, wherein the decision strategy comprises a program that activates one or more action instructions for a smart contract;

deploy the decision strategy on a private centralized oracle, wherein the decision strategy initiates the smart contract on the one or more blockchains;

send the one or more action instructions, by the decision strategy that was deployed, to the smart contract, wherein the one or more action instructions are responsive to one or more on-chain transactions; and execute the one or more action instructions, by the smart contract, wherein executing results in at least one new blockchain transaction.

* * * * *